(12) United States Patent
Weiser et al.

(10) Patent No.: US 8,103,769 B1
(45) Date of Patent: Jan. 24, 2012

(54) DYNAMIC ISOLATION OF SHARED RESOURCES

(75) Inventors: Ronny Weiser, Seattle, WA (US); Parikshit S. Pol, Bellevue, WA (US)

(73) Assignee: Amazon Technologies, Inc., Reno, NV (US)

(*) Notice: Subject to any disclaimer, the term of this patent is extended or adjusted under 35 U.S.C. 154(b) by 184 days.

(21) Appl. No.: 12/553,898

(22) Filed: Sep. 3, 2009

(51) Int. Cl.
*G06F 15/173* (2006.01)
(52) U.S. Cl. ........................................ 709/225; 709/226
(58) Field of Classification Search .......... 709/223–226, 709/217, 229
See application file for complete search history.

(56) References Cited

U.S. PATENT DOCUMENTS

| | | | | |
|---|---|---|---|---|
| 7,272,645 B2* | 9/2007 | Chang et al. | ................... | 709/223 |
| 7,509,372 B2* | 3/2009 | Dutta et al. | ................... | 709/203 |
| 7,660,853 B2* | 2/2010 | Scott et al. | ..................... | 709/205 |
| 7,921,196 B2* | 4/2011 | Harrang et al. | ............... | 709/223 |
| 2002/0073204 A1* | 6/2002 | Dutta et al. | .................... | 709/227 |

* cited by examiner

*Primary Examiner* — Hussein A. Elchanti
(74) *Attorney, Agent, or Firm* — Kilpatrick Townsend & Stockton LLP

(57) ABSTRACT

Shared resources can be isolated such that abuse of the resource by one user does not significantly affect the use of that resource by another user. A combination of access and flow control can be used, wherein a control gateway or other such component sits along a path between the user and the resource, such that the user obtains connections or access to the resource through the gateway. In this way, the gateway can control aspects such as the number of concurrent threads or channels granted to a user, as well as any delay in providing these threads or channels to the resource. A closed feedback loop can provide real-time information such that adjustments can be made dynamically, preventing abuse by users while also preventing the resource allocations from being underutilized.

25 Claims, 4 Drawing Sheets

DYNAMIC ISOLATION OF SHARED RESOURCES

BACKGROUND

As an increasing number of applications, services, devices, and other such components are being made available as shared resources, either locally, across a local area network (LAN), or remotely over networks such as the Internet, an increasing number of content, application, and/or service providers are turning to technologies such as cloud computing and virtualization. Cloud computing, for example, is an approach to providing access to electronic resources through services, such as Web services, where the hardware and/or software used to support those services is dynamically scalable to meet the needs of the services at any given time. A user or customer in such an environment typically will rent, lease, or otherwise pay for access to resources, and thus does not have to purchase and maintain the hardware and/or software to provide access to these resources.

When a user or client requests access to a resource in such an environment, a provider of the access typically will have to make certain resource guarantees to the user. In many cases a resource, such as a storage disk or processor, will be shared among multiple users. Each user can be allocated a specific portion of that resource, such as an amount of processing capacity or rate of input/output (I/O) operations. Because the resource is shared among multiple users, however, there is the potential of abuse by one of those users which can negatively impact access by the other users sharing that resource. Approaches such as long term learning and throttling by throughput control, for example, provided results that fell short of isolating users on dynamic and large scale systems.

BRIEF DESCRIPTION OF THE DRAWINGS

Various embodiments in accordance with the present disclosure will be described with reference to the drawings, in which.

DETAILED DESCRIPTION

Figure 1:
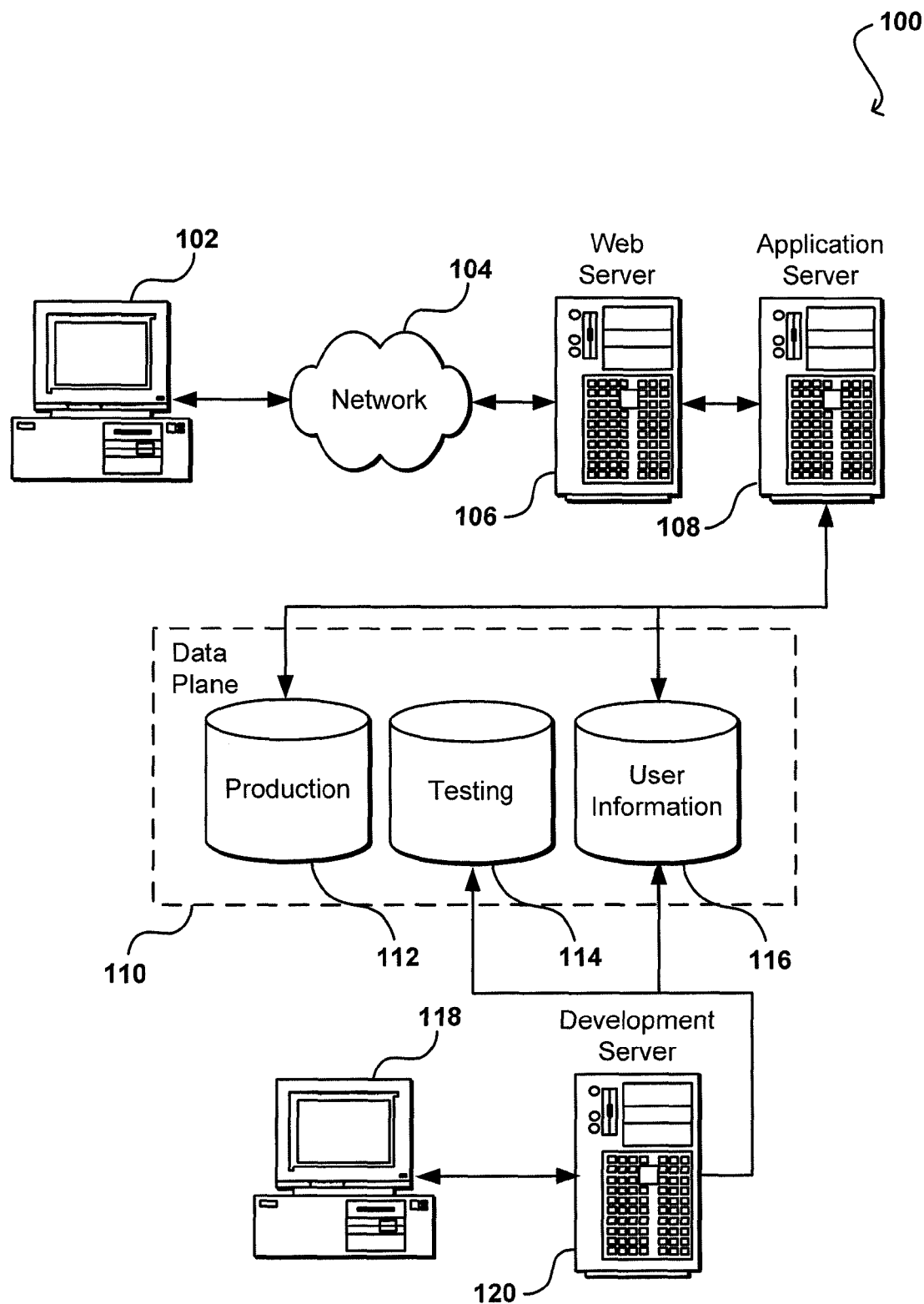
FIG. 1 illustrates an environment in which various embodiments can be implemented.

Systems and methods in accordance with various embodiments of the present disclosure may overcome one or more of the aforementioned and other deficiencies experienced in conventional approaches to managing shared resources in an electronic environment. In various embodiments, a combination of admission control and flow control is used to provide isolation of resources between users sharing those resources.

In various embodiments, at least one gateway or other such component (real or virtual) sits along each path between each requester and each shared resource. In many embodiments a requester will comprise a user submitting a request via a client device or similar component, while in other embodiments a requester can comprise any component or mechanism capable of requesting access to a resource, for example. In other embodiments, the requester and the resource or resource manager can be different components or portions of a single device, such as a trusted client that includes instructions for allocating and/or managing resources, where the client side code provides a gateway between the portion of the code that makes the request and the resource. Further, a "resource" can be any device, system, service, or other such component that can be accessed by, or connected to, a host system or other such device, whereby the device can perform functions such as to send requests to the resource. For ease of explanation the description will utilize terms such as "user" and "connection," and contexts such as Internet-based technology, but it should be understood that any appropriate requester, gateways, communication approaches, networks, and other such components and technologies can be used within the scope of the various embodiments. Further, a requester need not establish a physical connection in all the various embodiments, but can communicate or gain access to resources in other ways such as by sending requests, establishing a thread or session, etc. Thus, specific examples should not be interpreted as limiting the scope of the various embodiments as various alternatives exist as should be apparent in light of the teachings and suggestions contained herein.

In various embodiments, each user or requester contacts the gateway, such as once for each request, to obtain a connection or other such access to at least one managed resource. Because the gateway can manage the connection pool for one or more resources, the gateway can limit the usage of each resource by the various users. For example, the gateway can take advantage of a feedback loop to monitor usage of a resource by the users sharing that resource. If a user is exceeding an allocated quota, the gateway can adjust the connections granted for that user. For example, the gateway can control access to the resource by adjusting a number of concurrent connections that can be provided to a user. If a user is allocated up to ten threads but begins to abuse the resource, the user might only be allowed up to nine concurrent threads or fewer. To provide a finer level of control, the gateway also might control the flow of requests by introducing delays in the granting of connections in one or more of those threads. This can help to ensure that the user is not being too restricted, where a further reduction in the number of threads could cause the user to underutilize the resource. Various approaches to applying flow and admission control using these and other techniques are discussed in more detail below with respect to various embodiments.

In some embodiments where a user has access to multiple resources, the usage of a user can be monitored for any or all of those resources, and adjustments can be made to any or all of those monitored resources when the user is outside an acceptable range of usage. Further, adjustments can be made when multiple users fall outside an acceptable range of usage, or even when the users collectively fall outside an acceptable range of usage. Various other variations exist within the scope of the various embodiments and discussed and suggested herein.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a content provider, wherein multiple hosts might be used to perform tasks such as serving content, authenticating users, allocating resources, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide at least one resource access connection gateway, either as part of the data environment or in a path between the user and the data environment, that enables users and applications to access shared resources, while allowing customers, administrators, or other authorized users to allocate resources to various users, clients, or applications and ensure adherence to those allocations. Such functionality enables a user to perform tasks such as storing, processing, and querying relational data sets in a cloud without worry about latency degradation or other such issues due to other users sharing the resource. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk or data storage and IOPS, it should be understood that any appropriate sharable resource, such as a network card or graphics processor, can be used within the scope of the various embodiments, and any appropriate parameter can be monitored and used to adjust access or usage of such a resource by any or all of the respective users.

A connection gateway in accordance with one embodiment includes components (e.g., hardware and software) useful for providing aspects to resources in the cloud, such as in the data environment. In one embodiment, a set of application programming interfaces (APIs) or other such interfaces are provided that allow a user or customer to make requests for connection to the data environment. Once a connection is established for a user, such as for a query, the user can communicate directly with the resource to perform certain tasks relating to the resource, such as data storage. The user can use direct interfaces or APIs to communicate with the data repositories or other resources once a connection is established, but uses the connection gateway component(s) to obtain the connection.

Figure 2:
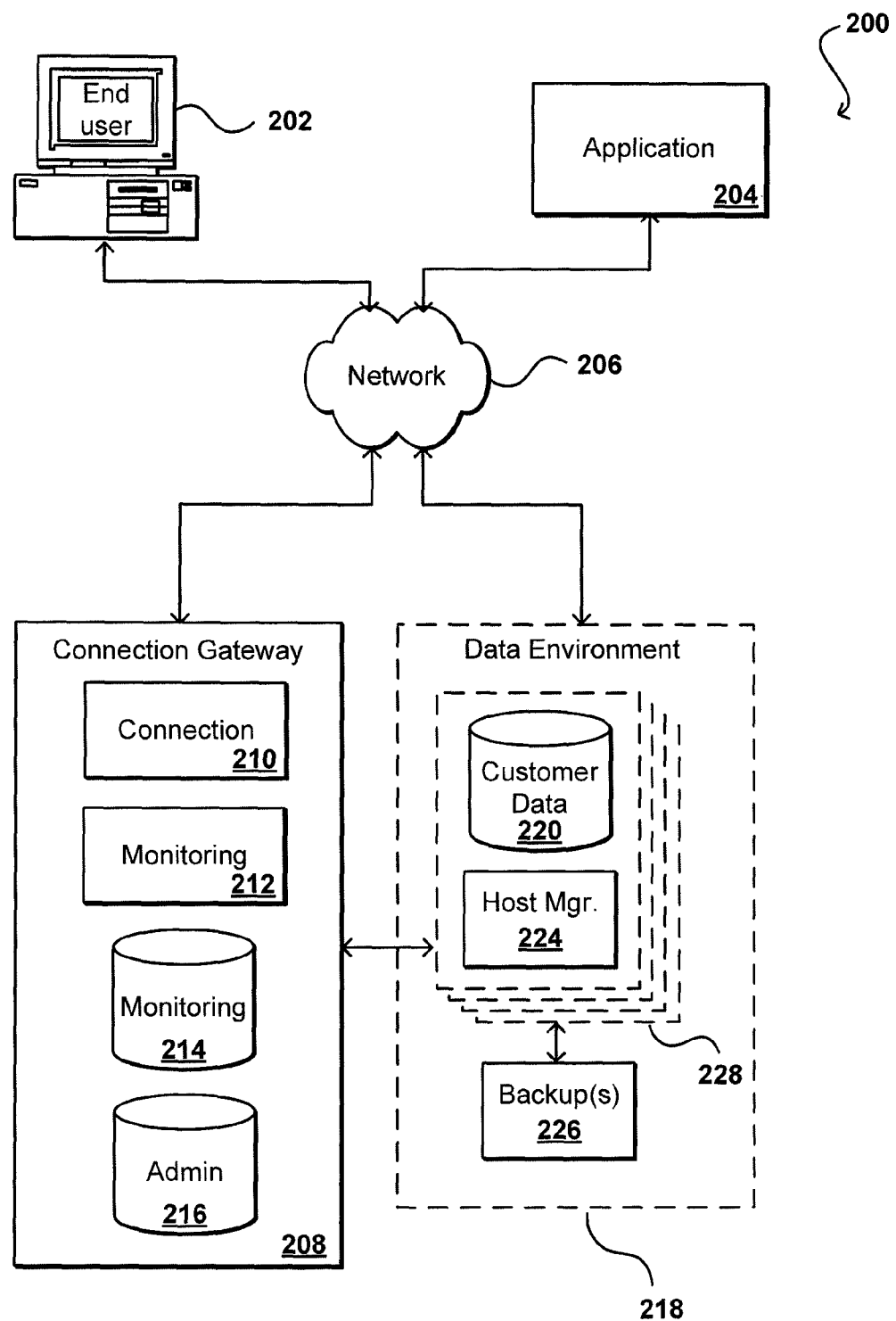
FIG. 2 illustrates a configuration for providing access and flow control for users of a shared resource that can be used in accordance with one embodiment.

FIG. 2 illustrates an example of a control gateway implementation 200 that can be used in accordance with one embodiment. In this example, a computing device 202 for an end user is shown to be able to make calls through a network 206 to the connection gateway 208 to perform a task such as to obtain a connection to a specified resource. The connection gateway can manage a pool of connections for a resource, such as a data instance, and can determine the allocation of those connections to the various users sharing the resource. Once a connection is established, the user or an application 204, for example, can access the resource directly through an interface of a data environment 210, independent of the connection gateway. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data "environment," it should be understood that this can refer to an actual or virtual separation of at least some resources (e.g., hardware and/or software) used to provide the respective functionality. Further, the gateway can be considered to be part of the data environment in certain embodiments.

The connection gateway 208 in this example is essentially a virtual layer of components that manages connections between a user and a resource in the data environment. While a single control gateway is shown in this embodiment, there can be multiple gateways in other embodiments, such as one per shared resource. The control gateway can include any appropriate combination of hardware and/or software, such as at least one application server configured with computer-executable instructions. The connection gateway also can include a set of APIs (or other such interfaces) for receiving Web services calls or other such requests from across the network 206, which the Web services layer can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection to be created, the resource for connection, or other such aspects.

The connection gateway can include one or more connection managers 210, each responsible for validating the user or client associated with the request and obtaining the appropriate connection. Such a component can handle various types of request and establish various types of connection, such as where the request is for a MySQL® Relational Database Management System (RDBMS) instance, for example, as opposed to an Oracle® RDBMS or other such instance. Components of the data environment can perform the necessary tasks to provide the resource, such as provisioning a data store instance, allocating a volume of off-instance persistent storage, attaching the persistent storage volume to the data store instance, and allocating and attaching a DNS address or other address, port, interface, or identifier which the customer can use to access or otherwise connect to the data instance. In this example, a user can be provided with the DNS address and a port address to be used to access the instance for a given connection. A user then can access the data store instance directly using the DNS address and port, without having to access or go through the connection gateway 208.

The connection gateway 208 in this embodiment also includes at least one monitoring component 212. When a data instance or other resource is created in the data environment, information for the instance can be written to a data store accessible to the connection gateway, such as a monitoring data store 214. It should be understood that the monitoring data store can be a separate data store or a portion of another data store. A monitoring component can access the information in the monitoring data store to determine information such as the past usage of resources by various users, a current number of threads being allocated to a user, and a current amount of delay being applied for a user. A monitoring component also can call into components of the data environment to determine information such as the number of active connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 216, which can store information such as the general allocation granted to a user, the throttling approach to use for a user, resource permissions for a user, or any other such information that can be specified and/or updated by an administrator or other such user, as is discussed in more detail elsewhere herein.

In a data environment example where users request connections to various data instances, each instance 228 in the data environment can include at least one data store 220 and a host manager component 224 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager also perform and/or mange the installation of software patches and upgrades for the data store and/or operating system. A host manger also can collect relevant metrics, such as may relate to CPU, memory, and I/O usage.

The connection manager can communicate periodically with each host manager 224 for which a connection has been established, or to an administration server or other component of the resource environment, to determine status information such as load, usage, capacity, etc.

As discussed, once an instance is provisioned and a user is provided with a DNS address or other address or location for a granted connection, the user can communicate "directly" with components or resources of the data environment 208 through the network using a Java Database Connectivity (JDBC) or other such client to directly interact with that instance 228. In one embodiment, the data environment takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 202 or application 204, for example, can be directed to a network address translation (NAT) router, or other appropriate component, which can direct the request to the actual instance 228 or host corresponding to the DNS of the request. Such an approach allows for instances to be dynamically moved, updated, replicated, etc., without requiring the user or application to change the DNS or other address used to access the instance. As discussed, each instance 228 can include a host manager 224 and a data store 220, and can have at least one backup instance 226 or copy in persistent storage. The user can directly issue structured query language (SQL) or other such commands relating to the data in the instance through the DNS address.

As discussed, a resource such as a data instance of FIG. 2 can be shared among multiple users, clients, applications, etc. For example, client A might be allocated 600 input/output operations per second (IOPS) for a given resource at a specified latency L, while client is allocated 800 IOPS at the same latency L. If the resource provides 1400 IOPS with latency L, beyond which the response time starts to degrade, both the clients will obtain an acceptable response time as long as they each respect their allocated quota. In one example, client B might start abusing the system by sending I/O requests at a rate that exceeds 800 IOPS. As a result of this behavior of client B, the response time for I/O requests from client A can begin to suffer. The resource guarantees for client A thus may not be met as a result of the activities of client B. In another example, client B might be a malicious actor and perform an action such as a Denial-of-Service (DoS) attack which could cause the resource to become unavailable. In order to address these and other such situations, systems and methods in accordance with various embodiments provide for dynamic resource isolation. Various approaches discussed and suggested herein can respond to changes in environment very rapidly, and can minimize the deviation from an allocation for a user quota regardless of user behavior. Various approaches perform resource isolation when the resource as a whole is being over-utilized, and thus would experience delays in operations, while other approaches perform resource isolation any time a user is at or above an allocation. Various approaches allow each user to interact with the resource as if the resource was dedicated to that user, with a capacity as specified by the allocation.

Resource guarantees in various embodiments are provided using what is referred to herein as "resource isolation." Resource isolation is a mechanism that safeguards or "isolates" a well-behaved customer from the effects of an ill-behaved customer who is abusing a resource or other aspect of a system or service, such as by attempting to exceed an allocated quota of a resource. Resource isolation is provided in various embodiments using a hybrid approach that utilizes both admission and flow control in an adaptive closed feedback loop-based system. In one aspect, admission control can be provided by adjusting the size and/or number of available input channels. For example, the number of threads accepting requests can be adjusted dynamically, as each request can require its own thread in various systems such that the number of threads can be adjusted any time a request is received and/or processed. In another aspect, flow control can be provided by introducing and/or adjusting delays for any of the requests, such as by delaying the connection of the user to a resource for any given thread. Admission and flow control both can have the effect of throttling or controlling the number of requests being processed ay any given time for a user, for example, but perform the throttling in different ways with different levels of granularity. The combined use of admission and flow control with a closed-loop feedback control process enables a system or service to, under load, provide resource availability for each user at respective target or allocated levels, and minimize the deviation of usage relative to conventional control methodology.

An example in accordance with one embodiment provides I/O resource isolation in a distributed system wherein multiple users share a disk. It should be understood that this is merely an example, and that various other resources, systems, and services can be used as well within the scope of the various embodiments. Further, the connection control will be discussed as a system in various embodiments, but it should be understood that such functionality can be provided as part of a service or other such offering. The example system includes a connection gateway 210, such as that described with respect to FIG. 2, which can control the number of threads available to an authorized user at any given time. Controlling the number of threads provides a first level of control over the number of requests that can be accepted by the system, and thus the amount of I/O being generated by any specific user. So, for example, if user A is allocated 500 IOPS and user A suddenly starts running at 700 IOPS, the system can detect the excess usage through the feedback mechanism and can reduce the number of concurrent threads available to user A. For example, if user A has ten threads allocated, the system can reduce the number of concurrent threads to nine and can analyze the results. If the usage is still appreciably above 500, the system can decide to further reduce the number of threads for user A to eight, and so on, until the user is at or near the allocated usage.

Systems in accordance with various embodiments can continue to iteratively decrease the number of threads until the usage is at or below the allocated amount. Such an approach is not desirable in all situations, however, as users inadvertently exceeding their capacity for a short period of time will still want to receive the allocated capacity for which the user is paying. Thus, an algorithm in at least one embodiment can be used to predict the relative effect of reducing the number of threads, and where a further reduction will likely cause the user to fall below the allocated amount, the system can switch to flow control for finer granularity adjustments. In other embodiments, the system will simply keep reducing the number of threads until the user is at or below the allocated amount, then will add back an additional thread with at least some flow control to attempt to get the user back near the allocated resource level. If a system only attempts to throttle requests using admission control, an amount of I/O usage quota can go underutilized because of too few threads being allocated. In other instances, the I/O usage can go over the quota by a small amount because of slightly too many threads. In some cases adding or removing a single thread can take the system resource usage for a given user above or below the allocated quota and vice versa. In these cases the system could continually adjust the number of threads to attempt to maintain resource usage around the given threshold. In such cases, however, a user at any given time could be either over-utilizing or underutilizing the allocated resources.

Various approaches can be used to determine the number of threads to be allocated to a user at any given time. A first approach calculates the average number of resources consumed per thread by dividing the total resources consumed by the number of threads that are running. The target for the user can be divided by the calculated resource utilization per thread, and the channel width can be adjusted to that value. Another approach instead changes the number of threads and observes the change in resource utilization. The resource utilization contribution of each added or removed thread then can be calculated, and the distance from the target can be divided by the calculated resource utilization per added or removed thread. The channel then can be adjusted using this value.

One approach first calculates the target number of threads to be allocated to a user based on factors such as the current observations of number of threads currently in the system and the current resource isolation. The calculation can be performed using an appropriate allocation formula, such as may be given by:

$$n\_target = n\_curr + ((r\_target - r\_curr)/r\_perthread)$$

where
  n_target is the target number of threads,
  r_curr is the current resource utilization by a user on the system,
  r_target is the target resource utilization for that user,
  n_curr is the current number of threads in the system, and
  r_perthread is the resource utilization per thread, or the load per thread.

If the current resource usage r_curr is above the threshold r_target, the number of threads allocated to a user can be decreased by a number that is proportional to the resource utilization per thread. There are multiple ways to compute the load per thread of the resource utilization per thread. For example, the average load per thread can be determined by:

$$r\_perthread = r\_curr/n\_curr$$

Or, if there has been a change in the number of threads since the last observation in the system, then the average load per thread can be computed by:

$$r\_perthread = n\_change/r\_diff$$

where
  n_change is the change in the number of threads since the last observation,
  r_diff is the difference in resource utilization since the last observation, and
  r_perthread is the resource utilization per thread.

The approach to use can vary between embodiments and situations, such as where the request pattern has changed and the same type of requests are being consistently received.

Systems and methods in accordance with various embodiments can provide for improved control by introducing delays in one or more of the allocated threads for any given user. Such an approach can help to control the resource usage at a finer granularity than can be obtained by adjusting only the number of available threads, channels, or connections. In some systems, determining that the addition or removal of one thread makes the resource usage to go above or below the allocation threshold can trigger the use of delays. In one embodiment, the delay is introduced in only one of the threads in order to obtain the desired usage, as the need to delay more than one thread can be addressed through removal of a thread, for example. In other embodiments where it is desirable to spread the delay across the requests, instead of focusing the delay only on certain requests, small delays can be added to each thread until the desired usage level is obtained. For example, if there are nine threads, a small delay can be added to the threads one at a time until the desired usage level is obtained, where the small delay might be applied to four threads, for example, instead of increasing the delay four times on just one of those nine threads, where one of out nine requests can, on average, experience a relatively large delay.

Figure 3:
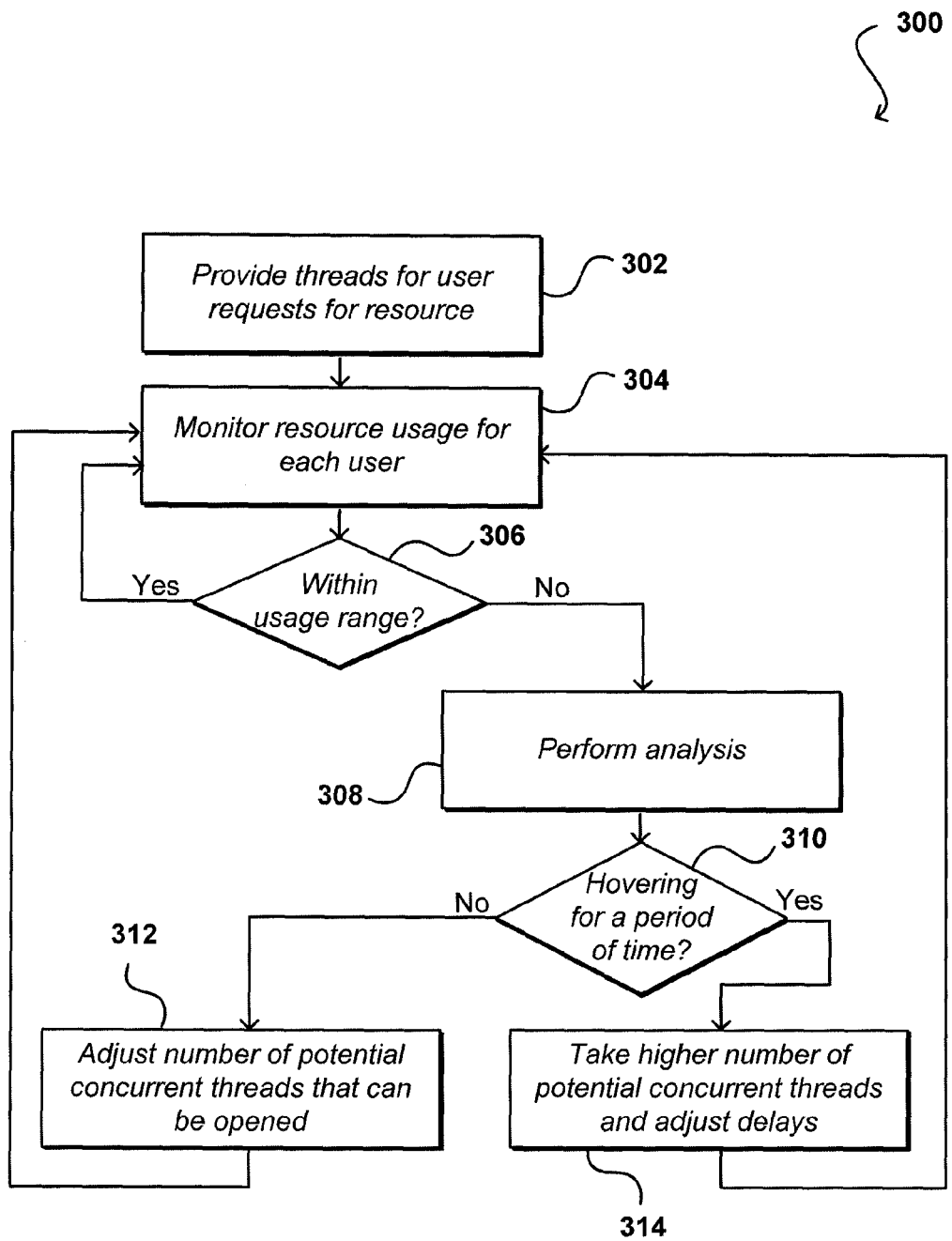
FIG. 3 illustrates an example of a process for providing access and flow control that can be used in accordance with one embodiment.

FIG. 3 illustrates steps of a process 300 for providing resource isolation using such algorithms in accordance with one embodiment. In such a process, an initially allocated number of potential concurrent threads is provided to each user of a resource 302. The number of threads can vary between users, and can vary according to other aspects, such as time of day, etc. Further, the allocated number can represent a maximum number of concurrent threads or connections that can be provided to a user at any time, and the user might often utilize less than the allocated number. The resource utilization for each user can be monitored 304 using any of a variety of approaches known in the art or discussed herein. For example, this can involve a monitoring component of the control gateway making a call into a relational database management system (RDBMS) or similar resource to obtain information relating to usage for any users sharing a resource. If the usage is below a specified threshold for the resource 306 for a particular user, the allocation can remain at the current levels and the monitoring can continue. In other embodiments, the allocation can remain at the current levels if the usage is below a specified allocation threshold for the resource and above a minimum usage threshold, or otherwise within a desired range.

If the usage for one of the users is above an allocation threshold, or otherwise outside an acceptable range of values, for example, analysis can be performed to determine an appropriate adjustment to be made 308, such as by performing one or more calculations as to adjustments to be made for the user. As part of this analysis, or as part of an additional process, a determination can be made as to whether the usage for a particular user has been hovering around the threshold (e.g., moving above and below as a result of adjustments) for at least a specified amount of time 310. If not, the number of potential concurrent threads allocated to the user can be adjusted 312, such as by waiting for one or more connections or threads to terminate, and then allowing a number of new concurrent threads or connections to be created or established based upon the resource utilization of the requestor, as discussed elsewhere herein. In one embodiment, the average resource utilization per thread is determined, and the number of threads allocated to the user is adjusted such that the target number of threads multiplied by the average resource utilization approximately equals the target resource utilization. With the number of threads adjusted, the monitoring can continue as discussed above. Since each request can utilize its own connection in some embodiments, reducing the number of threads does not involve closing connections or threads in at least some of these embodiments, but simply reducing the number of concurrent new threads that can be processed. For example, if a new request would have utilized a tenth thread, but the number of maximum allocated concurrent threads is reduced to nine, the request must instead wait until a thread is available (e.g., released) from the nine currently being utilized.

If the usage for one of the users has been hovering around the threshold for at least a specified amount of time, and either the target number of threads does not change or changing the number of threads does not produce the desired results, a finer-level adjustment can be made by introducing at least a first delay into at least one of the threads 314. This can involve taking the higher of two values determined for the appropriate number of threads, where the higher number would enable to user to exceed the allocation threshold but the lower number would cause the user to potentially underutilize the resource. A determined amount of delay can be calculated in one embodiment to be applied to the higher number of potential concurrent threads. In other embodiments, a first delay value can be applied to at least one of the threads (using the higher number of potential concurrent threads) and the delay and/or number of threads to which the delay is applied can be iteratively increased (or decreased) until the usage is within an acceptable range. With the delay introduced, the monitoring process can continue and further adjustments can be made as necessary. The monitoring process can take advantage of a feedback loop to monitor the resource usage, and this usage information can be used to adjust the number of threads and/or delays applied. If the resource usage is below the threshold, the delays can be reduced and, if zero delay is applied, threads can be added back for the user as long as the user remains below the threshold. If a maximum delay is applied but the user is above the threshold, then the delay can be reduced to zero and the number of threads decreased. Various other combinations of paths through the process are possible as well as should be apparent.

As discussed, each query or request can get its own individual connection, such that introducing a delay can involve establishing a delay between the time that a thread is requested and/or available for the request, and the time at which the connection to the resource is actually provided to the user. Various other types of delay can be used as well within the scope of the various embodiments. Further, as discussed above, the amount of delay to be applied can be determined by calculating an anticipated amount of delay, or simply applying a first delay value (which may be a specified or dynamically determined value, for example) and iteratively increasing or decreasing the delay values and/or number of threads to which the delay is applied until the usage is within the desired range. With the change in delay applied, the monitoring process can continue. The monitoring process can take advantage of a feedback loop to monitor the resource usage, and this usage information can be used to adjust the number of threads and/or delays applied. Various other combinations of elements of such a process are possible as well as should be apparent.

Figure 4:
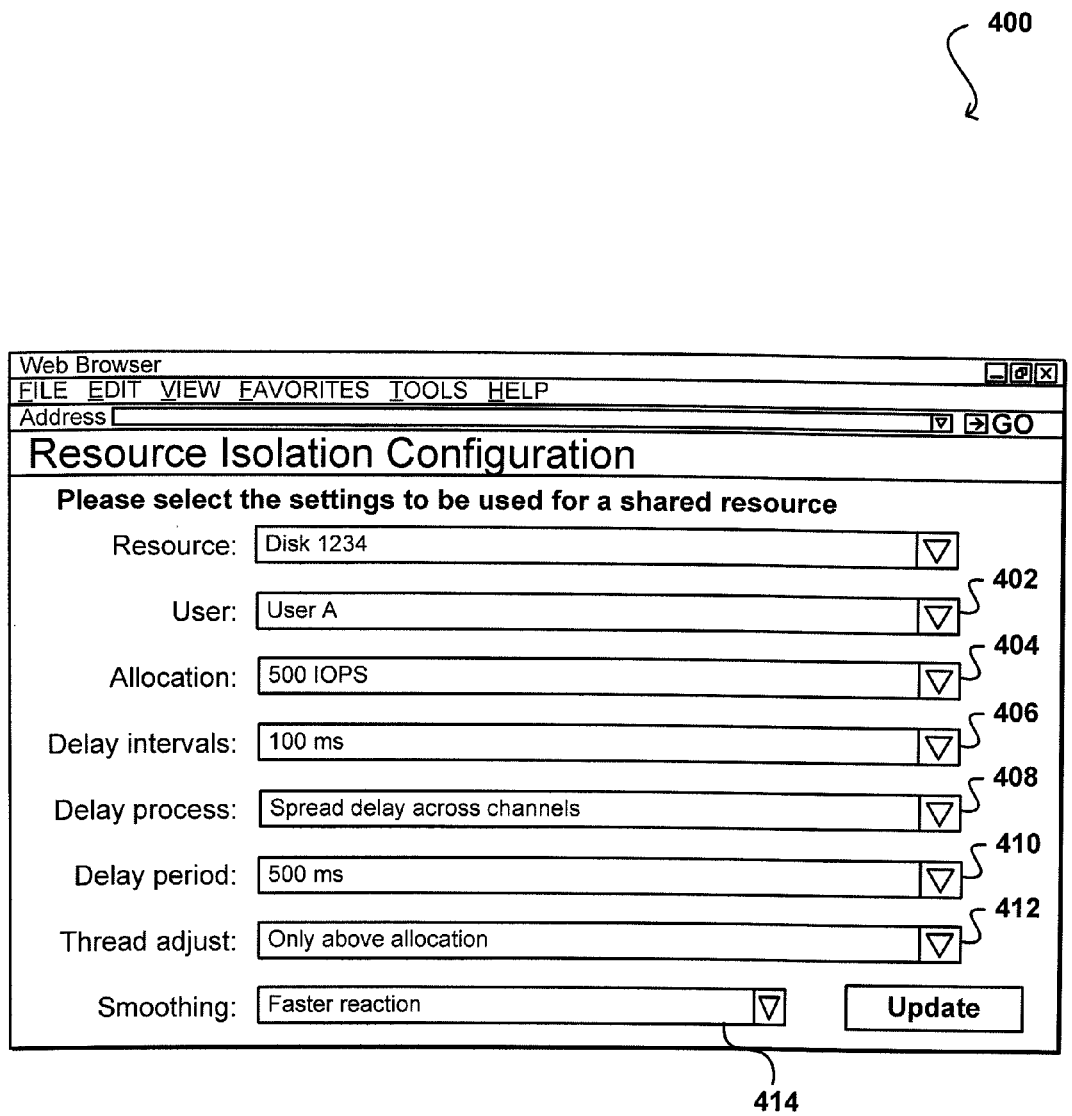
FIG. 4 illustrates an example of a display allowing an administrator to configure aspects of access and flow control that can be used in accordance with one embodiment.

Many aspects of the system can be configurable by an administrator or other authorized user. Further, many of these aspects can be separately configurable for different users, resources, instances, etc. For example, FIG. 4 illustrates an example of a display 400 that can be used to configure aspects of resource isolation and management in accordance with various embodiments. In this example, it can be seen that an administrator can pull up a screen of information that relates to the allocation of at least one resource for a specified user 402. In this case, the administrator is able to set an allocation 404 of IOPS for a disk resource for a specified user. The interface enables the administrator to set various parameters, such as the amount of delay to apply 406 (e.g., the incremental amount to be applied in one embodiment) and the delay approach to apply 408. For example, an administrator can configure whether to apply the delays to multiple channels or to apply different delays to a single channel. The administrator also can specify the amount of time to wait before introducing delays 410. As discussed above, certain algorithms attempt to isolate the resource first using admission control, and will only activate flow control (i.e., the use of delays) after a specified period of time, which can be configurable using the present example interface. The administrator also can specify whether to continue reducing the number of threads or channels until the resource utilization drops below the allocation threshold 412. As discussed, such an approach can result in a user underutilizing the allocation quota, so in some embodiments a system can be configured to reduce threads until it is predicted that a further reduction will cause the user to drop below the allocation, at which point flow control can be triggered. An administrator also can specify a default smoothing factor to be used 414, although in some systems the factor can vary dynamically based upon certain criteria. Various other aspects and combinations can be configured using such an interface in accordance with various embodiments. Further, although the interface is shown as a page rendered in a browser application, it should be understood that this is merely an example and that any appropriate interface can be used to enable an administrator or similar authorized user to configure aspects of the system or service.

When analyzing usage data, it can be desirable in various embodiments to analyze recent usage history instead of only the most recent data. For example, there can be variations or "spikes" that can cause a user to be throttled unnecessarily if only relying upon a single data point. Accordingly, various algorithms look at the usage pattern over a recent period of time, such as over the last second, several seconds, etc. An algorithm also can use at least one smoothing criteria in an attempt to minimize the effect of spikes or anomalies and instead analyze actual user trends. As known in the art, longer or increased smoothing values have the benefit of minimizing the effect of spikes or anomalies, but can reduce the ability of the system to detect and react to rapid changes. Similarly, shorter or lesser smoothing criteria can allow the system to react more quickly, but can result in the number of threads or delays being increased or decreased inappropriately as the analysis can be based on very few data points. In some embodiments, an administrator can set the smoothing criteria, or a user can agree to certain smoothing criteria. In other embodiments, the system can adjust the smoothing criteria based on factors such as ranges, deviations, or any other appropriate factors.

Due in part to the dynamic nature of large distributed systems, an approach that utilizes a feedback loop to iteratively analyze results and make appropriate adjustments at different levels of granularity can converge to an appropriate state much more quickly that conventional throttling approaches or existing learning-based approaches. For example, learning for any such system can take a significant amount of time in order to understand and predict the proper actions for a given state, and since the state can change at any time, the system may often be too slow to react, which can affect performance for various users.

However, at least some historical analysis or learning can be used advantageously with various embodiments. For example, algorithms used to calculate a target number of threads or amount of delay can take into account behavioral information for a user. For example, if a user typically runs expensive queries at night, such information can be used to determine the number of threads to allocate to that user, as the load per thread at certain times may be likely to be higher. Further, if a customer utilizes a significant amount of resources during business hours but few during other hours, different thresholds or ranges can be offered or utilized to determine the amount of delays applied or number of threads needed at those times. Another approach could adjust the smoothing coefficient, such that during peak hours a smaller coefficient can be used so the system is faster to react to variations in usage. In some cases, the smoothing coefficient can even be reduced to zero at peak load such that any usage above the allocated amount results in a change in the number of threads or amount of delay, etc. Further, since the system is tracking usage information at least an amount of time, a rate of change or similar information can be determined that can be used to predict usage. In this way, the system can attempt to introduce delays or otherwise make adjustments to attempt to prevent the user from exceeding the allocated usage while minimizing the impact to the user. For example, if it appears that the user may soon exceed the allocated usage, small delays might be introduced to attempt to "level off" the usage near the threshold. Such an approach would likely not be detectable by the user, but would prevent a decrease in resource availability for other users sharing the resource. Various other predictive algorithms and preventative actions can be used as well as should be apparent to one of ordinary skill in the art in light of the teachings and suggestions contained herein.

In some embodiments, another "maximum" or high threshold value can be set, which can vary by resource, user, time of day, or other such factors. This threshold can reflect a substantial abuse of a resource by a user, and can result in significant throttling of the user. For example, a user reaching the maximum threshold can have the number of allocated threads reduced to a single thread until the usage either drops below the maximum threshold or drops back near or below the allocated threshold.

In some embodiments, the amount of delay applied can vary based upon types of requests. For example, a search request might utilize significantly more resources than a write request. In such cases, the system can determine a type of request and apply appropriate delays. Further, longer delays may be more noticeable for quick requests than longer requests, such that it might be desirable to avoid long delays for quick requests that might be noticeable to the user. Further, the number of target threads can be adjusted based upon the type of request received. For example, if a request is received that will take a significant amount of resources, the system might decide to reduce the number of threads available to that user until the resource-intensive query is completed. Various other reasons for applying different delays to different types of requests, tasks, or actions for a resource can be used as well within the scope of the various embodiments.

An approach in accordance with one embodiment also provides for the prioritizing of requests. For example, if a large query is submitted that will require a significant amount of resources, thread and delay control may not be sufficient to prevent other users from being affected by the processing of the query. In such a case, there can be a level of prioritization applied to at least some requests, wherein processing of a request can be paused, for example, to allow other requests to be processed without having to wait for the large query to be completed. In such an embodiment, the control gateway or similar component can set a flag or value for a connection that can indicate such processing to the resource or resource manager, etc.

In some embodiments, access and flow control can be performed at multiple levels in various systems. For example, there can be one or more interfaces to both internal and external systems. A resource manager might not have the access or authorization to terminate connections in at least some of these systems, but can at least have the ability to monitor or receive information regarding usage of these resources, and can send requests into these internal or external systems to terminate connections or otherwise manage the requests, threads, etc. For example, a relational database system (RDBMS) might not allow an external system to control connections to a data table or data instance, for example, but a connection manager can call into or otherwise communicate with the RDBMS to determine usage and request that the number of allocated threads be changed or other such functions be executed. Various other variations exist as should be apparent in light of the disclosure contained herein. Thus, adjusting aspects such as the number of allowable concurrent threads and the amount of delay applied can be done either directly or indirectly in various embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for managing usage of one or more shared resources, comprising:
   under control of one or more computer systems configured with executable instructions,
      providing access for each of a plurality of users to at least one shared resource using a connection gateway, the connection gateway configured to provide all connections to the at least one shared resource for the plurality of users;
      monitoring behavior of each of the plurality of users with respect to at least one allocated threshold for the at least one shared resource; and
      if the monitored behavior of at least a first user with respect to the at least one allocated threshold for a determined shared resource exceeds a specified range with respect to the at least one allocated threshold for the determined shared resource:
         calculating a target number of concurrent connections to the determined shared resource to be granted to the first user based at least in part upon the monitored behavior with respect to the at least one allocated threshold for the determined shared resource and the specified range;
         if the target number of concurrent connections is different than a current number of allocated concurrent connections for the first user to the determined shared resource, adjusting the number of allocated concurrent connections to the determined shared resource for the first user; and
         if the target number of concurrent connections is the same as a current number of allocated concurrent connections for the first user to the determined shared resource, adjusting a delay for at least one of the allocated connections, the delay indicating a period of time to wait between receiving a request for access and providing the at least one of the allocated connections to the determined shared resource for the first user.

2. The computer-implemented method of claim 1, wherein:
   adjusting a delay for at least one of the allocated connections occurs only after a minimum period of time wherein the monitored behavior of the first user with respect to the at least one allocated threshold for the determined shared resource exceeds the specified range.

3. The computer-implemented method of claim 1, wherein:
   the target number of concurrent connections is determined based at least in part upon an average load per connection.

4. A computer-implemented method for managing usage of at least one shared resource, comprising:
   under control of one or more computer systems configured with executable instructions,
      monitoring behavior of each of a plurality of users with respect to at least one allocated threshold for at least one shared resource being shared by at least a portion of the plurality of users;

if the monitored behavior of at least a first user of the plurality of users with respect to the at least one allocated threshold for a determined shared resource satisfies a first criterion, adjusting a number of concurrent connections to the shared determined resource allocated to the first user; and if the monitored behavior of the first user satisfies a second criterion, adjusting an amount of delay applied for at least one of the concurrent connections to the shared determined-resource allocated to the first user.

5. The computer-implemented method of claim 4, wherein:
the first criterion is a usage near or above the allocated threshold for the determined shared resource.

6. The computer-implemented method of claim 4, wherein:
the second criterion is a usage near or above the allocated threshold for the determined shared resource in combination with at least a period of time near or above the allocated threshold.

7. The computer-implemented method of claim 4, wherein:
the second criterion is a usage near or above the allocated threshold for the determined shared resource in combination with a further adjustment in the number of concurrent connections being likely to cause the first user to underutilize the shared resource.

8. The computer-implemented method of claim 4, further comprising:
if the monitored behavior of a first user of the plurality of users with respect to the at least one allocated threshold for the determined shared resource satisfies a third criterion, adjusting the number of concurrent connections to the determined shared resource allocated to the first user to one connection.

9. The computer-implemented method of claim 4, wherein:
the shared resource is one of a disk, a data store, a processor, network card, or network resource.

10. The computer-implemented method of claim 4, wherein:
adjusting the number of concurrent connections includes iteratively adjusting the number of connections until the monitored behavior with respect to the at least one allocated threshold for the determined shared resource no longer satisfies the first criterion.

11. The computer-implemented method of claim 4, wherein:
adjusting the amount of delay applied for at least one of the connections includes iteratively applying a fixed amount of delay for a single connection or across a plurality of connections for the first user.

12. The computer-implemented method of claim 4, further comprising:
calculating the amount of delay to be applied for at least one of the connections.

13. The computer-implemented method of claim 4, wherein:
monitoring behavior of each of the plurality of users includes monitoring over a specified period of time.

14. The computer-implemented method of claim 13, further comprising:
specifying at least one smoothing factor to be applied to the monitored behavior over the specified period of time.

15. The computer-implemented method of claim 13, wherein:
the amount of delay to be applied is determined based at least in part upon a type of request for the connection.

16. The computer-implemented method of claim 4, further comprising:
prioritizing requests for connection based at least in part upon the type of request.

17. The computer-implemented method of claim 4, wherein:
at least one resource being shared by the users comprises network bandwidth, and
monitoring the behavior of each of the plurality of users with respect to an allocated threshold for the network bandwidth is performed at least in part to provide at least a guaranteed bandwidth for each of the plurality of users.

18. The computer-implemented method of claim 4, further comprising:
when the monitored behavior of multiple users with respect to the at least one allocated threshold for the at least one determined shared resource satisfies the first criterion, adjusting a number of concurrent connections to the at least one shared determined resource allocated to each of the multiple users.

19. A system for managing usage of one or more shared resources, comprising:
a processor; and
a memory device including instructions that, when executed by the processor, cause the processor to:
monitor behavior of each of a plurality of users with respect to at least one allocated threshold for at least one shared resource being shared by at least a portion of the plurality of the users;
if the monitored behavior of a first user of the plurality of users with respect to the at least one allocated threshold for a determined shared resource satisfies a first criterion, adjust a number of concurrent connections to the determined shared resource allocated to the first user; and
if the monitored behavior of the first user satisfies a second criterion, adjust an amount of delay applied for at least one of the concurrent connections to the determined shared resource allocated to the first user.

20. The system of claim 19, wherein:
the first criterion is a usage near or above the at least one allocated threshold for the determined shared resource; and
the second criterion is a usage near or above the at least one allocated threshold for the determined shared resource in combination with either a period of time near or above the at least one allocated threshold or a further adjustment in the number of concurrent connections being likely to cause the first user to underutilize the determined shared resource.

21. The system of claim 19, wherein:
adjusting the number of concurrent connections includes iteratively adjusting the number of connections until the monitored behavior no longer satisfies the first criterion.

22. The system of claim 19, wherein:
adjusting the amount of delay applied for at least one of the connections includes iteratively applying a fixed amount of delay for a single connection or across a plurality of connections for the first user.

23. A non-transitory computer readable storage medium storing instructions for managing access to at least one shared resource, the instructions when executed by a processor causing the processor to:
monitor behavior of each of a plurality of users with respect to at least one allocated threshold for at least one shared resource being shared by the users;
if the monitored behavior of a first user of the plurality of users with respect to the at least one allocated threshold for a determined shared resource satisfies a first criterion, adjust a number of concurrent connections to the determined shared resource allocated to the first user; and if the monitored behavior of the first user satisfies a second criterion, adjust an amount of delay applied for at least one of the concurrent connections allocated to the first user for the determined shared resource.

24. The non-transitory computer-readable storage medium of claim 23, wherein:

the first criterion is a usage near or above the at least one allocated threshold for the determined shared resource; and the second criterion is a usage near or above the at least one allocated threshold for the determined shared threshold in combination with either a period of time near or above the at least one allocated threshold or a further adjustment in the number of concurrent connections being likely to cause the first user to underutilize the determined shared resource.

25. The non-transitory computer-readable storage medium of claim 23, wherein:

adjusting the number of concurrent connections includes iteratively adjusting the number of connections until the monitored behavior no longer satisfies the first criterion, and adjusting the amount of delay applied for at least one of the connections includes iteratively applying a fixed amount of delay for a single connection or across a plurality of connections for the first user.

\* \* \* \* \*